United States Patent
Balacheff et al.

(10) Patent No.: US 10,116,701 B2
(45) Date of Patent: Oct. 30, 2018

(54) DEVICE-TYPE BASED CONTENT MANAGEMENT

(71) Applicant: Ent. Services Development Corporation LP, Houston, TX (US)

(72) Inventors: Boris Balacheff, Lyons (FR); James C. Cooper, Bloomington, IN (US); David Penkler, Claix (FR)

(73) Assignee: Ent. Services Development Corporation LP, Houston, TX (US)

( * ) Notice: Subject to any disclaimer, the term of this patent is extended or adjusted under 35 U.S.C. 154(b) by 124 days.

(21) Appl. No.: 15/301,291

(22) PCT Filed: Apr. 1, 2014

(86) PCT No.: PCT/US2014/032466
§ 371 (c)(1),
(2) Date: Sep. 30, 2016

(87) PCT Pub. No.: WO2015/152894
PCT Pub. Date: Oct. 8, 2015

(65) Prior Publication Data
US 2017/0026420 A1    Jan. 26, 2017

(51) Int. Cl.
*H04L 29/06* (2006.01)
*G06Q 10/06* (2012.01)
*G06Q 10/10* (2012.01)

(52) U.S. Cl.
CPC .............. *H04L 63/20* (2013.01); *G06Q 10/06* (2013.01); *G06Q 10/10* (2013.01)

(58) Field of Classification Search
CPC ... H04L 63/08; H04L 63/20; H04L 29/08099; G06F 21/31; G06Q 10/06; G06Q 10/10
(Continued)

(56) References Cited

U.S. PATENT DOCUMENTS 7,207,041 B2 * 4/2007 Elson ................... G06F 9/5011
                                                        718/1
8,341,717 B1    12/2012 Delker et al.
(Continued)

FOREIGN PATENT DOCUMENTS

KR      20110070005 A    6/2011

OTHER PUBLICATIONS

Centrify Delivers Industry's First Unified Identity Solution for Secure Enablement of Enterprise Mobile, SaaS and BYOD Environments; Feb. 25, 2013, 4 pages. < http://finance.yahoo.com/news/centrify-delivers-industrys-first-unified-120800467.html >.
(Continued)

*Primary Examiner* — Hosuk Song
(74) *Attorney, Agent, or Firm* — Sheppard Mullin Richter & Hampton LLP

(57) ABSTRACT

Examples of systems and methods for device-type content management are described herein. In an example, at least one of a community policy and a community-device type policy may be generated. The community policy may be generated for a community defined for an enterprise and may be enforced on a plurality of user devices registered with the community. Further, the device-community policy may be enforced on a user device, from among the plurality of user devices, based on a device-type of the user device. The device-community policy may indicate a management service to be used to realize the community policy. Further, a management service agent (MS agent) may be provided to the user device, based on the management service indicated by the device-community policy. The MS agent may provide for managing enterprise content on the user device as indicated by the community policy.

15 Claims, 12 Drawing Sheets

(58) Field of Classification Search
USPC .................................... 726/1, 2–6; 709/229
See application file for complete search history.

(56) References Cited

U.S. PATENT DOCUMENTS

| | | | | |
|---|---|---|---|---|
| 8,544,058 | B2 * | 9/2013 | Lim .................... | G06F 17/3089 |
| | | | | 713/156 |
| 8,572,676 | B2 * | 10/2013 | Sapp .................. | H04L 41/0806 |
| | | | | 726/1 |
| 8,695,058 | B2 * | 4/2014 | Batchu ................ | G06F 21/6245 |
| | | | | 726/1 |
| 8,745,384 | B2 * | 6/2014 | Persaud ................ | G06F 21/606 |
| | | | | 713/165 |
| 8,839,354 | B2 * | 9/2014 | Manickam .............. | H04L 67/34 |
| | | | | 726/1 |
| 2010/0299376 | A1 | 11/2010 | Batchu et al. | |
| 2013/0254837 | A1 | 9/2013 | Brannon et al. | |
| 2013/0297662 | A1 | 11/2013 | Sharma et al. | |
| 2013/0298185 | A1 | 11/2013 | Koneru et al. | |
| 2013/0318589 | A1 | 11/2013 | Ford et al. | |
| 2014/0006347 | A1 | 1/2014 | Qureshi et al. | |
| 2014/0032759 | A1 | 1/2014 | Barton et al. | |

OTHER PUBLICATIONS

PCT Search Report/Written Opinion—Application No. PCT/US2014/032466 dated Dec. 23, 2014—10 pages.

* cited by examiner

DEVICE-TYPE BASED CONTENT MANAGEMENT

BACKGROUND

Nowadays, many enterprises are promoting bring your own device (BYoD) policy. These enterprises may implement the BYoD policy, for a variety of reasons including the potential for lower infrastructure costs and increased employee satisfaction by providing the flexibility to employees use their personally owned devices. The BYoD policy allows the employees to bring personally owned computing devices, such as laptops, smartphones, and tablets, to office. Thus, the employees may access privileged enterprise data, such as databases, applications, and emails, on their own device. Further, the employees may also be allowed to remotely access the enterprise data from locations outside the office. As the enterprise data is not accessed using enterprises-owned devices, to ensure integrity and security of the enterprise data, the enterprise may subject the personally owned computing devices to a security policy defined by the enterprise.

BRIEF DESCRIPTION OF FIGURES

The detailed description is provided with reference to the accompanying figures. In the figures, the left-most digit(s) of a reference number identifies the figure in which the reference number first appears. The same numbers are used throughout the figures to reference like features and components.

DETAILED DESCRIPTION

Figure 1:
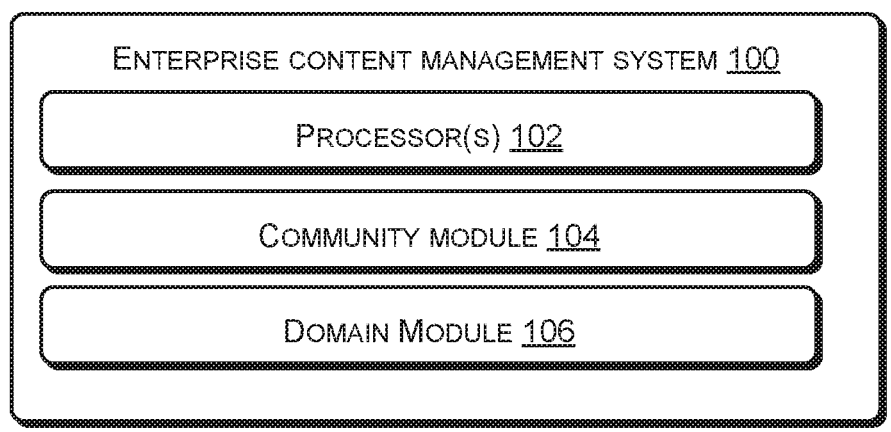
FIG. 1 illustrates an enterprise content management system, according to an example of the present subject matter.

The present subject matter relates to systems and methods for implementing device-type based management of enterprise content. In an example, management may include controlling and protecting access to the content and device configuration settings. Further, the enterprise content may include, for example, data and various applications owned and maintained by an enterprise.

With enterprises moving to adopt a BYoD policy, various information technology (IT) service providers are offering a variety of management services to manage enterprise content on associated devices. To manage the enterprise content, a security policy defined by the enterprise may be implemented on users' personally owned devices. The security policy may be configured to affect footprint of the enterprise content on the device to ensure that during personal use access to the enterprise content is restricted. Generally, the security policies are implemented by way of management services. For example, the management service may include mobile device management (MDM) services, mobile application management (MAM) services, or desktop management (DM) services. Such management services are often standardized and offered to multiple customers. However, the approach of offering a pre-defined standard service may have certain limitations.

For example, traditional MDM services and DM services may support a limited number of device-types. A device management service, such as a MDM service or a DM service, is typically used to secure, monitor, control, and support devices. Further, standardizing one such management service may not be advisable as a standardized service may not support the rapidly increasing range of new device-types and operating systems (OS). Additionally, the IT service providers may use a given MDM/DM service for a given device, which in turn may limit the IT and security management controls offered by the MDM and DM services.

In another example, the MAM services offer a method to make content, such as the enterprise content available to users across different platforms, i.e., multiple OS and devices. Although, the MAM services enforce some amount of security and IT management policies, the MAM services are often perceived to offer a lower level of security with fewer controls. Further, traditional MAM services may support a subset of platforms and therefore may not be used for all device and OS types. Accordingly, offering a standardized management service may either not satisfy customer requirements or may not support all device-types, whether new or legacy.

Further, as eco-system of computing devices, also referred to as digital eco-system, produces an increasing variety of devices, a user may prefer to have the flexibility to securely access enterprise content from any device. For example, the user may prefer to use a tablet or a smartphone to access enterprise content on the go, laptop at office, a touch enabled wall while in a conference room, a family computer at home, and a bedroom television when retiring for the evening. However, with the ability to move between devices, the enterprises are burdened to securely deliver enterprise content to an increasing number of platforms. As mentioned above, with the explosion in the digital eco-system there may be no common standard for delivering applications or enforcing security controls, which in turn may prevent the enterprises from supporting a new device.

In addition to the expanding digital eco-system, many users may be performing tasks for multiple employers or may be accessing enterprise content of more than one enterprise. Generally, a management platform implemented by the enterprise, also referred to as an authoritative source, assumes that it has the authority for each device it manages and delivers applications to. However, such an approach may not address the issue of securely delivering applications and data to a range of devices where each device may have multiple authoritative sources depending on an active task.

For example, a user may be working on a presentation for company A and a report for company B on the same device. In such a scenario, company A may like to deliver the presentation application to the user's device and protect data pertaining to the presentation; while simultaneously company B may like to deliver the report application to the user's device and protect the data pertaining to the report. Furthermore, both company A and company B may prefer to have the ability to remove the application(s) and associated data from the user's device once the task has been completed or the user is no longer associated with the company.

In cases where isolation of personal and enterprise content is not possible, both may be deleted for compliance with the security policy, which however may not be acceptable to the user.

Systems and methods for device-type based management of content are described. In an example, an enterprise may define a plurality of communities to selectively manage enterprise content. A community may be understood to comprise a set of user devices on which a similar policy is implemented for security and IT control. Further, for all the user devices registered to a community, a similar policy, also referred to as a community policy, is enforced. For example, for each enterprise, a community may be defined to address specific requirements by way of a community policy.

Additionally, for each community, a device-community policy may also be defined. While the community policy may define a generic policy that is to be enforced on the user devices registered with a community; the device-specific community policy may be define how the community policy is to be implemented for a given type of user device registered with a given community. Thus, the device-community policies may define how the requirements listed by the community policy and additional requirements, if any, may be realized for different device-types.

Thus, based on a community policy, application delivery mechanisms, device delivery mechanisms, and/or security management mechanism may be defined to manage the enterprise content. In an example, the community policies and corresponding device-community polices may be realized by way of management services. For instance, the application delivery mechanism may be realized using management services, such as MAMs, the device delivery mechanisms may be realized using the management services, such as MDMs or DMs, and the security management mechanism may be realized using the management services, such as dedicated management tools, MAM, MDM, DM, or a combination thereof. Further, the management services, such as dedicated management tools, MDMs, DMs, and MAMs may be configured for a device-type associated with a community. Accordingly, based on a type of device, different management services may be implemented. The management services may perform device management, application management, policy management, system software management, or a combination thereof.

In an example, the community policy may generally define the rules to be enforced while managing enterprise content, and implementation of the community policies may be realized by way of the management services using corresponding adapters. An adapter may translate the community policy or the device-community policy to instructions understood by the corresponding management service. Thus, by way of adapters, for managing the content of a community, multiple management services may be employed and new management services may be added without having to change the policy. For example, for different device-types in a community, different management solutions may be used, which may be indicated by a corresponding device-community policy. Accordingly, the content management may be supported on multiple device-types, which may provide flexibility to the users to use any device-type.

Further, a user may register a plurality of user devices to access content of at least one community. Based on a device-type and a community the user wishes to register to, a corresponding community policy and a device-community may be identified. As mentioned above, the policies, the community and the device-community, may be implemented using management services. An agent corresponding to the management service may be identified and provided to the user device. The user device may install the agent and may thereafter be provided access to the content of the community. Based on the community policy and the device-community policy, the user may be granted access to one or more applications and other data pertaining to the community.

Thus, the present subject matter provides flexibility to various enterprises to define policies to manage the enterprise content, based on their preferences without having to follow a standardized approach. Further, the policies may be defined to manage the enterprise content on a range of user devices, such as tablets, smartphones, laptops, desktops, televisions, and the like. Additionally, the present subject matter provides for implementation of a combination of management services to manage the enterprise content efficiently. Further, owing to the provision of a user being registered with multiple communities, for each community a corresponding community policy may be implemented to manage the enterprise content relating to that community.

The above systems and methods are further described in conjunction with figures and associated description below. It should be noted that the description and figures merely illustrate the principles of the present subject matter. It will thus be appreciated that various arrangements that embody the principles of the present subject matter, although not explicitly described or shown herein, can be devised from the description and are included within its scope.

FIG. 1 illustrates an enterprise content management system 100 to manage content, according to an example of the present subject matter. In an example, the enterprise content management system 100, hereinafter referred to as the system 100, may be hosted by an enterprise to manage content, including data and applications. The system 100 may include, amongst other things, a processor 102, a community module 104 communicatively coupled to the processor 102, and a domain module 106 also communicatively coupled to the processor 102.

The processor 102 may include microprocessors, microcomputers, microcontrollers, digital signal processors, central processing units, state machines, logic circuitries and/or any other devices that manipulate signals and data based on computer-readable instructions. Further, functions of the various elements shown in the figures, including any functional blocks labeled as "processor(s)", may be provided through the use of dedicated hardware as well as hardware capable of executing computer-readable instructions.

In an example, a community module 104 may define a community policy for each of a plurality of communities registered with the system 100. A community may be formed based on community grouping attributes, for example, organizations a user may work for and user roles. For instance, an enterprise providing services to various organizations may have a community of each organization. Further, in another example, an enterprise may also define communities based on user groups, such as developers, testers, and business analysts. The community policy may define a generic high level policy independent of device-type and how the community policy may be realized in a given scenario. The community policy, for example, may indicate that a particular application may be made available to authenticated users, between certain hours, and in certain geographies.

The community module 104 may also define a device-community policy for each of a plurality of device-types. A device-type may be used to group similar device together, based on device grouping attribute. In an example, the device grouping attribute may be portability, accordingly two device-types may be portable devices and non-portable devices. In another example, the device grouping attribute may be based on an underlying OS. In Further, the device-community policy may inherit requirements indicated in the community policy. In addition to rules specified by the community policy, the device-community policy may also include certain additional requirements that may be added for a given device-type. Further, while the community policy may indicate the rules or requirements for managing the enterprise content associated with a community, the device-community policy may define how the high level policy, indicated by the community policy, should be realized on a given device-type.

The community policy and the device-community policy may be enforced using a management service. The management service may be used to perform management operations to manage content on a user device. The management operations may include, for instance, securing, monitoring, controlling, and supporting the user devices and the enterprise content made available to the user devices.

Referring to the example of the community policy, where the community policy indicates that an application may be made available to authenticated users, between certain hours, and in certain geographies, a corresponding device-community policy may indicate a web-based location-based service to be used for implementing the community policy for a given device-type. Further, if the community policy defines that geographic location is to be verified with strong assurances, the device-community policy may indicate a device management service to be used for the given device-type, such as a non-portable user device. Still further, if the community policy specifies that an application's data is to be protected at rest, in transit, and while being processed, with different levels of assurances depending on context; the device-community policy may specify a device management service, based on the device-type, to fully control applications on a user device to prevent malware attacks on the data. Alternatively, if a device management service can not be implemented, the device-community policy may specify a remoting service, such as a streaming application to be used to protect the enterprise data. The remoting service may be compatible with the application and the user device.

Accordingly, based on a management service indicated by a device-community policy to be enforced on a user device, the domain module 106 may configure and provide at least one management service agent to be installed on the user device to manage the enterprise content. The domain module 106 may identify the management service, based on the device-community policy. Thus, the community module 104 may define policies governing device behavior, in terms of content access and security controls, and the domain module 106 may aid in enforcing the behavior dictated by the community policies on user devices. The community module 104, the domain module 106, and various other components of the system 100 are described in detail in conjunction with FIG. 2.

Figure 2:
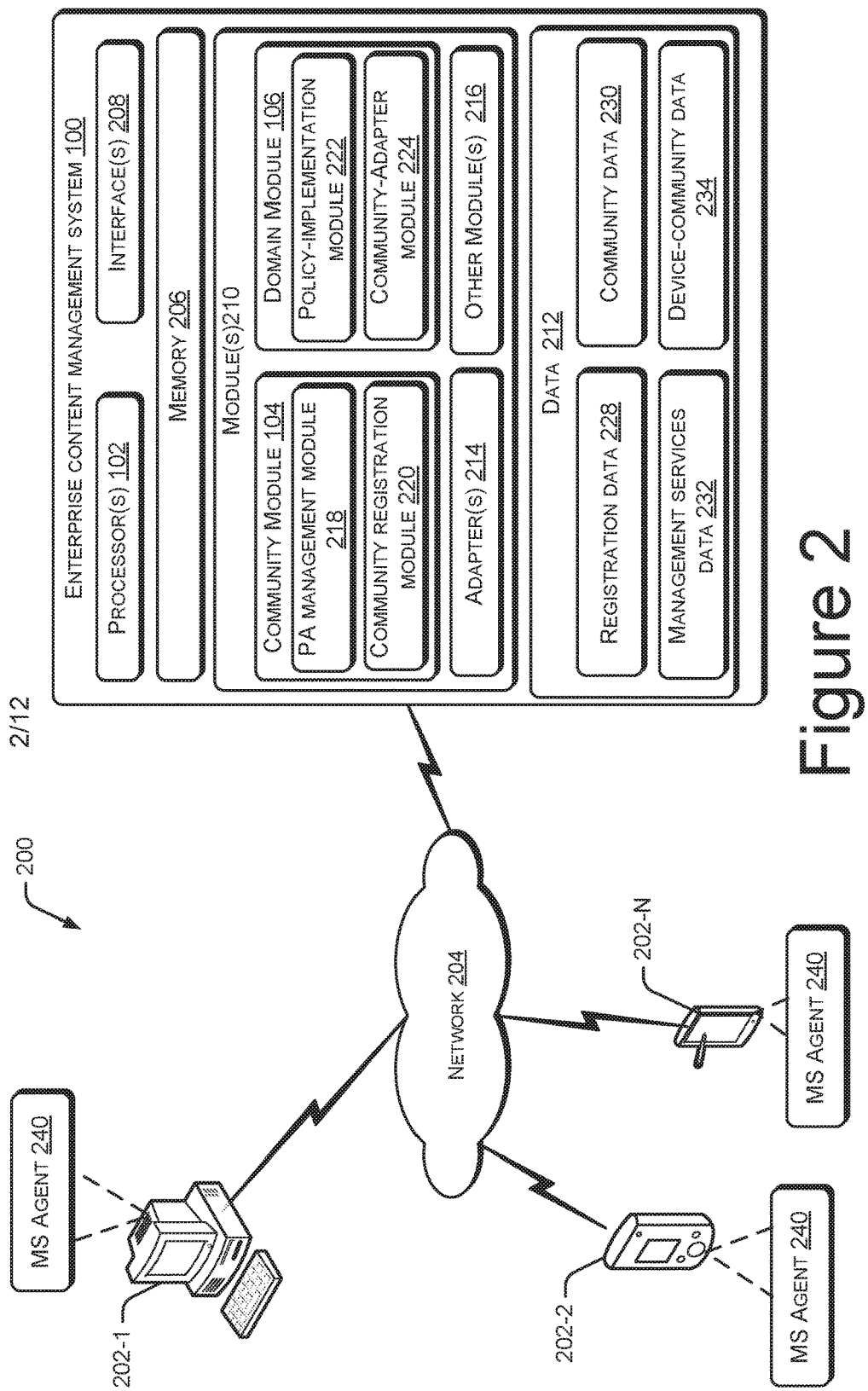
FIG. 2 illustrates a network environment implementing the enterprise content management system, according to an example of the present subject matter.

FIG. 2 illustrates a network environment 200 implementing the system 100, according an example of the present subject matter. As illustrated, a plurality of user devices 202-1, 202-2, . . . 202-n may communicate with the system 100 to manage the content, based on community and device-community policies defined by an enterprise. The user devices 202-1, 202-2, . . . 202-n may be collectively referred to as the user device(s) 202. The user devices 202 may include, for example, network based devices, such as laptops, tablets, desktops, smartphones, personal digital assistants (PDAs). In an example, the user devices 202 may be computing devices personally owned by employees of an enterprise. The user devices 202 may communicate with the system 100 over a network 204.

The network 204 may be a wireless network, a wired network, or a combination thereof. The network 204 can also be an individual network or a collection of many such individual networks, interconnected with each other and functioning as a single large network, e.g., the Internet or an intranet. The network 204 can include different types of networks, such as intranet, local area network (LAN), wide area network (WAN), the internet, and such. The network 204 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. The network 204 may also include individual networks, such as but not limited to, Global System for Communication (GSM) network, Universal Telecommunications System (UMTS) network, and Long Term Evolution (LTE) network. Further, it may be understood that the communication between the system 100, the user devices 202, and other entities may take place based on the communication protocol compatible with the network 204.

As illustrated, the system 100 may include the processor 102, a memory 206, interface(s) 208, module(s) 210, and data 212. The processor 102, among other capabilities, may fetch and execute computer-readable instructions stored in the memory. The memory 206 may be communicatively coupled to the processor 102 and may include any non-transitory computer-readable medium, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The interfaces 208 may include a variety of commercially available interfaces, for example, interfaces for peripheral device(s), such as data input output devices, referred to as I/O devices, storage devices, and network devices. The interfaces 208 may facilitate multiple communications within a wide variety of networks and protocol types, including wired networks and wireless networks.

The modules 210, amongst other things, include routines, programs, objects, components, and data structures, which perform particular tasks or implement particular abstract data types. The modules 210 may also be implemented as, signal processor(s), state machine(s), logic circuitries, and/or any other device or component that manipulate signals based on operational instructions. Further, the modules 210 can be implemented by hardware, by computer-readable instructions executed by a processing unit, or by a combination thereof. The modules 210 may include the community module 104, the domain module 106, adapter(s) 214, and other modules 216. The other modules 216 may include computer-readable instructions that supplement applications or functions performed by the system 100. In an example, the community module 104 may include a policy-application (PA) management module 218, and a community registration module 220. Further, the domain module 106 may include a policy implementation module 222 and a community-adapter module 224.

Further, the data 212 includes registration data 228, community data 230, management services data 232, device-community data 234, and other data (not shown in the figures). The other data may include data generated and saved by the modules for providing various functionalities of the system 100.

In an example, the community module 104 may provide for performing an action relating to communities in the system 100, application(s) to be accessed by user devices registered with each of the communities, and defining of the community policy. The actions may include creation, deletion, or modification of the communities, the associated applications, the community policies, and the device-community policies.

In one example, the actions pertaining to community and associated applications may be performed by a community administrator. The community administrator may interact with the system 100 using a computing device, such as the user device 202. The policy-application (PA) management module 218 may authorize the community administrator, based on the registration data 228. The registration data 228 may include user IDs and corresponding passwords of the community administrator(s) authorized to access the system 100.

Once the community administrator is authorized, the PA management module 218 may provide a community list indicating communities already created for the enterprise and maintained by the system 100. The community list may be stored in the community data 230. The community administrator may provide a request to create, delete, and modify a community. For the purpose of explanation, it may be considered that the community administrator provides a community creation request. In response to community creation request, the PA management module 218 may request the community administrator to provide information defining a community policy for the newly added community. The information may include details pertaining community attributes, which may aid in providing controlled access to the enterprise content. The community attributes may include, for example, role based access to the community and associated applications, location based access to the community and the associated applications, and time based access to the community and the associated applications. Since, the community policy may be defined at a high level and may not include specific implementation details, it may be convenient for the community administrator to define the community policy.

The PA management module 218, in an example, may also aid in defining the device-community policies for the community. The PA management module 218 may provide a device-types list including a plurality of device-types to the community administrator. The device-types list may be stored in the device-community data 234. For each device-type selected by the community administrator, a corresponding management service list may be provided to the community administrator. The management service list may be stored in the management services data 232. Further, the management service list may include management services supported by a selected device-type. Thus, for various device-types and/or communities, varying combinations of management services may be selected.

To define the device-community policy for a device-type, at least one management service from the management service list may be selected by the community administrator. The management service may be selected based on parameters, such as security, performance, and costs. Based on the selected management services, the PA management module 218 may generate, a device-community policy, for a given device-type, which may indicate that the community policy is to be realized using selected management services. The PA management module 218 may also associate the device-community policy with the community policy so that the device-community policy inherits requirements specified the community policy. The device-community policy may be stored in the device-community data 234.

Further, in addition to the community policy, in certain cases additional inputs may be provided by the application owner and security administrator for defining a device-community policy. The additional inputs may be provided as the various management services may serve different sets of devices and/or applications, which may not have similar functionalities. The additional inputs may include configuration parameters, such as maximum interval for a device to be off-line before it is considered potentially compromised and triggering additional authentication steps when reconnecting again. Accordingly, based on the community policy and the additional inputs, if any, the PA management module 218 may define a policy file for each the selected management services. Further, based on the policy file, the community-adapter module 224 may configure a corresponding management service using a corresponding adapter 214.

The community-adapter module 224 may, for each selected management service, may request the corresponding adapter 214 to associate a community and corresponding device-community policy(ies) with the management service. For associating a community with the management service, inputs, such as a community name, a community ID, and a community description may be provided by the PA management module 218 to the community-adapter module 224. Similarly, for associating a policy with the management service, inputs, such as policy name, policy ID, policy file, and community ID may be provided. Further, each adapter 214 provides for configuring a management service, based on a device-community policy, to create a management service instance for a given community. In a similar manner, a community policy, a device-community policy may be deleted or modified.

Further, in certain cases, the community module 104 may generate a community policy; however device-community policies may not be defined. In such cases, a default device-community policy may be used. For instance, the community-adapter module 224 may define a default device-community policy for each of the communities associated with the system 100. Thus, in case device-community may not be defined, the default device-community may be used to manage the user devices 202.

In an example, to make a new community available to the users, the community may be published in a content management domain. The content management domain may interface the user devices 202 with the communities to access relevant enterprise content. The content management domain may be managed by the community-adapter module 224. To publish the community in the content management domain, a domain administrator may provide a community publication request to the system 100. The community publication request may be received by the community-adapter module 224. In response to the request, the community-adapter module 224 may provide a community list, which may include published as well as unpublished communities. Further, the community-adapter module 224 may request the domain administrator to select an unpublished community and provide publication details, such as community name, community description, visibility, and installation mode. For instance, the domain administer may select a community to be published. Further, publication details and the selected community, which may be identified using the community name, may be saved and published in the content management domain.

In an example, the content management domain may have an application store including a plurality applications associated with the enterprise. Further, each community may also have a separate application store, which may include the applications associated with the community. Like, other manageable entities, i.e., entities that are to be managed, associated with a community, the PA management module 218 may provide for management of the applications. Examples of manageable entities include a community policy and associated device-community policies, system applications, and other enterprise related applications. The manageable entities may be stored in the community data 230. As can be gathered from description provided above, the community and device-community policies may be taken to be directly linked to the community, and may be configured and managed as described above. Further, the system applications may also be managed based on a management service indicated by a device-community policy. The configuration and management of the enterprise related applications may be understood with reference to the description provided below.

For instance, among other things, the PA management module 218 may provide for creation of new application in the application store of the content management domain. The PA management module 218 may receive a request from the community administrator to add a selected application. In response, the PA management module 218 may request the community administrator to provide common application data. The common application data may include details for application parameters common to all device-types. For example, the application parameters may include name, description, download URL, and version. Further, the PA management module 218 may request the community administrator to select device-types to be associated with the application. For each selected device-type, application-device type data may be requested. The application-device type data include details, such as download bits, which may change from one device-type to other. The application-device type data and common application data, along with the application, may be stored the content management domain, for instance, in the device-community data 234.

Further, similar to publication of the community, the new application may be published in the application store of a community to make the application available to user devices registered with the community. The community adapter module 224 may provide for configuration of certain application parameters, such as installation mode: mandatory or optional and visibility of the application inside the community. Since the community supports different device-types and the application may have application-device type data for each device-type, the application may be created, configured, and bound, or linked, to an application management service selected for each of the device-types associated with the community.

In an example, the community-adapter module 224 may, for each selected device-type, using a corresponding device-community policy, identify an application management service selected to manage applications. For each device-type, the application may be created and configured in each application management service, based on corresponding application-device type data. Further, application may be configured using the adapter 214, such as an application management adapter, corresponding to the identified application management service. For instance, configuring the application management service may include defining user groups that may be provided to access to the application.

Further, the application may also be bound to the community using the adapter 214 and may be indicated in the application store of the community. Furthermore, the applications may be visible to users if they are members of the groups for which the applications have been authorized. Accordingly, when a user registers to community, the applications that are to be made available to community in general are identified and thereafter, based on the device-type, access to some or all of the applications may be provided to the user device.

This way the applications, for each device-type, may be managed by the application management service indicated by a corresponding device-type policy, when enforced. It will be appreciated that similar to application creation, an application may be modified or deleted. For example, for deleting the application, a corresponding application ID may be provided.

In an example, the user devices 202 may be provided access to the applications and data, based on a community they are registered to. To register a user device 202 and/or a user to a community, the policy implementation module 222 may obtain domain credentials from the user device 202. The domain credentials may include, for instance, user name, password, and a device-type of the user device 202. Further, in an example the policy implementation may determine the device-type, while user name and password may be provided by the user through the user device 202.

The policy implementation module 222 may ascertain whether the user and/or user device 202 are registered with the content management domain, based on the registration data 228, which may include domain credentials of the users and associated user devices 202 registered by the content management domain. In case it is ascertained, that user and/or user device 202 are not registered, the policy implementation module 222 may register the user and/or the user device 202. Further, the user may be authenticated, based on the registration data 228. For instance, it may be ascertained whether the user device 202 that is currently being used by the user is bound to the user, based on the registration data 228. For instance, a user may be using a new user device 202 to access the content management domain; however the new user device 202 may not be registered with the content management domain and may also not be associated with the user. In such cases, the policy implementation module 222 may associate the user device 202 with the user to generate user-device pair.

In case it is ascertained that the user and/or user device 202 are registered with the content management domain, the policy implementation module 222 may provide a community list indicating communities registered with the content management domain, or to say, defined by the enterprise. The user may select a community from the list and in response to the selection, the policy implementation module 222, may request the user to provide community credentials, such as user name associated with the community and password, to register the user with the selected community. The policy implementation module 222 may provide the community credentials to the community registration module 220. The community registration module 220 may register the community credentials of the user in the community data 230.

In an example, a user may be registered with a community; however may not be registered with the content management domain. In such cases, in order to not encumber the user with the task of acquiring domain credentials, dummy domain credentials, for example, user name, for the user, may be generated by the policy implementation module 222. Further, the policy implementation module 222 may identify a device-type of the user device 202. The dummy user name and the device-type may be registered with the content management domain, and may be bound to each other to generate user-device pair. Additionally, the community selected by the user may be bound to the domain credentials of the user, i.e., dummy domain credentials in the present case.

Based on the device-type and the community the user wishes to register with, a device-community policy to be implemented on the user device 202 may be identified. As mentioned before, if a device-community policy is not specified for a community by the PA management module 218, the policy implementation module 222 may identify a default device-community policy defined for the community. Based on the identified device-community policy, the policy implementation module 222 may determine a management service(s) to be used for managing content accessed by the user device 202. For each management service, the policy implementation module 222 may enroll the user and the user device 202 to the management service using the corresponding adapter 214. The policy implementation module 222 may enroll, or to say, add the user and the user device 202 to a management service repository (not shown in the figures) of the management service. Further, for each management service, the policy implementation module 222 may bind the user to the user device 202 and to the community in the management service repository. The binding or linking of the user device 202 and the community to the management service, aids the management service in mapping the manageable entities available for the user-device pair.

Accordingly, for the user-device pair registered with the community, the adapter 214 may provide a corresponding management service agent (MS agent) 240. The MS agent 240 may include an instance of the management service, which may be configured based on the device-community policy and the community policy. Accordingly, for each management service indicated by the device-community policy, a corresponding MS agent 240 may be installed on the user device 202. The policy implementation module 222 may provide the MS agent 240, for each management service indicated by a corresponding device-community policy, to the user device 202. The user device 202 may receive and install the MS agent 240 to manage the content. Using the installed MS agent 240, the user may install applications available for the current device-type. This allows the user to move between devices and receive correct application package. An application package may be understood to include software components comprising the application bundled with the community policy in a manifest file associated with the application. Further, the information pertaining to the applications installed by each user and corresponding device-types may be made available to the community administrator.

FIG. 3a-3d, FIG. 4a, and FIG. 4b illustrate various sequence diagrams, according to various examples of the present subject matter. Further, certain trivial steps have been omitted in the sequence diagrams, for the sake of brevity and clarity.

Figure 3A:
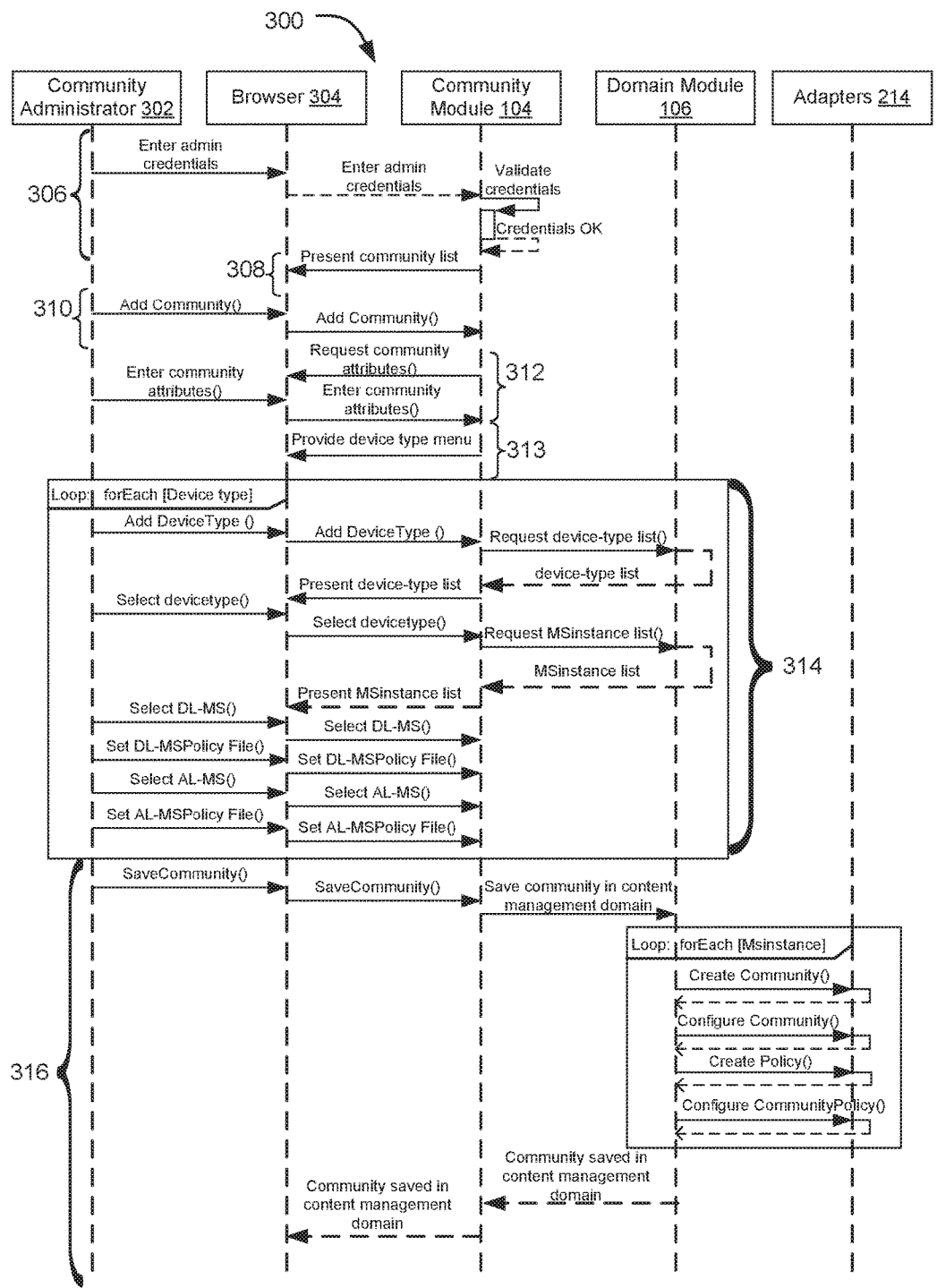
FIGS. 3a-3d illustrate sequence diagrams for various processes pertaining to content management, according to an example of the present subject matter.

Referring to FIG. 3a, a sequence diagram 300 indicating a community creation process is illustrated, according to an example of the present subject matter. As illustrated, a community administrator 302 may interact with the system 100 using a corresponding computing device, such as the user device 202, through a browser 304 of the system 202. To access the system 100, the community module 104 may request the community administrator 302 to provide credentials, such as a user ID and a password. Further, the received credentials may be validated based on the registration data, such as the registration data 228. The various messages that may be exchanged between the community administrator 302, the browser, and the community module 104 are depicted by step 306.

When the credentials are validated, the community module 104 may provide the community list to the community administrator 302 as illustrated by step 308. To create a community, the community administrator 302 may provide a community creation request as indicated by step 310. In response, the community module 104 may request the community administrator 302 to provide details pertaining community attributes to define a community policy for the newly added community. The information exchange between the community administrator 302 and the community module 104 is illustrated by step 312.

Upon defining the community policy, the community module 104 may provide a device-type settings menu to the community administrator 302 to define device-community policy to be associated with the community. The same is illustrated at step 313. At step 314, on receiving an input from the community administrator 302 to define the device-community policy, the community module 104 may request the domain module 106 to provide a device-type list, which in turn is provided to the community administrator 302. For each device-type selected by the community administrator 302, the community module 104 may obtain a management service instance list form the domain module 106 and provide to the community module 104.

From the device-types list, the community administrator 302 may select a plurality of device-types and for each selected device type, a management service may be selected to define the device-community policy. The management service list may include a management service instance for each management service supported by a given device-type. Based on the management services, such as a device level management service (DL-MS) and an application level management service (AL-MS) may be selected by the community administrator 302. Further, based on the inputs received from the community administrator 302, a policy file may be set for each of the selected management service. The policy files generated for each selected management service may together define a device-community policy and the community policy for the selected device-type.

Once the policy files are generated, at step 316, the community administrator 302 may provide a request to the community module 104 save the community. The community module 104 may in turn request the domain module 106 to save the community in the content management domain. The domain module 106 may, using the adapters 214, create the community in the management service repository and configure the management service based on the device-community policy. In an example, messages that may be exchanged to save community are illustrated at step 316.

Figure 3B:
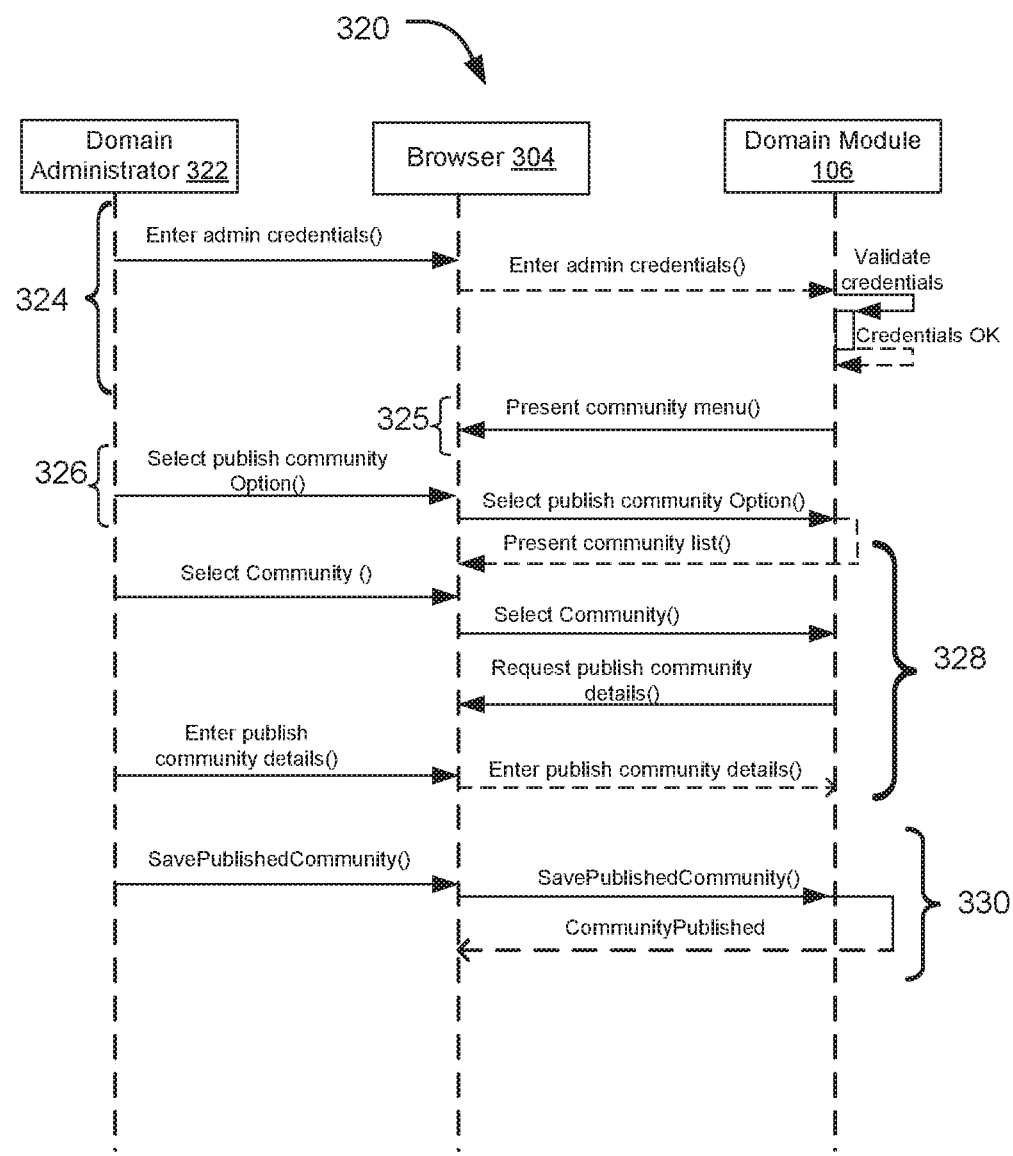

FIG. 3b illustrates a sequence diagram 320 indicating a community publication process, according to an example of the present subject matter. As illustrated, the domain module 106 may validate domain credentials provided by a domain administrator 322. The various messages that may be exchanged for validation are illustrated in step 324. If validated, the domain module 106 may provide a community menu indicating various actions that may be performed pertaining to the communities to the domain administrator 322, as illustrated at step 325. Further, to publish the community, the domain administrator 322 may select a publish community option as indicated by step 326. Further, at step 328, the domain module 106 may provide the community list, and the domain administrator 322 may select a community to be published and provide the publication details. Finally, at step 330, the community and the community details may be saved and published in the content management domain.

Figure 3C:
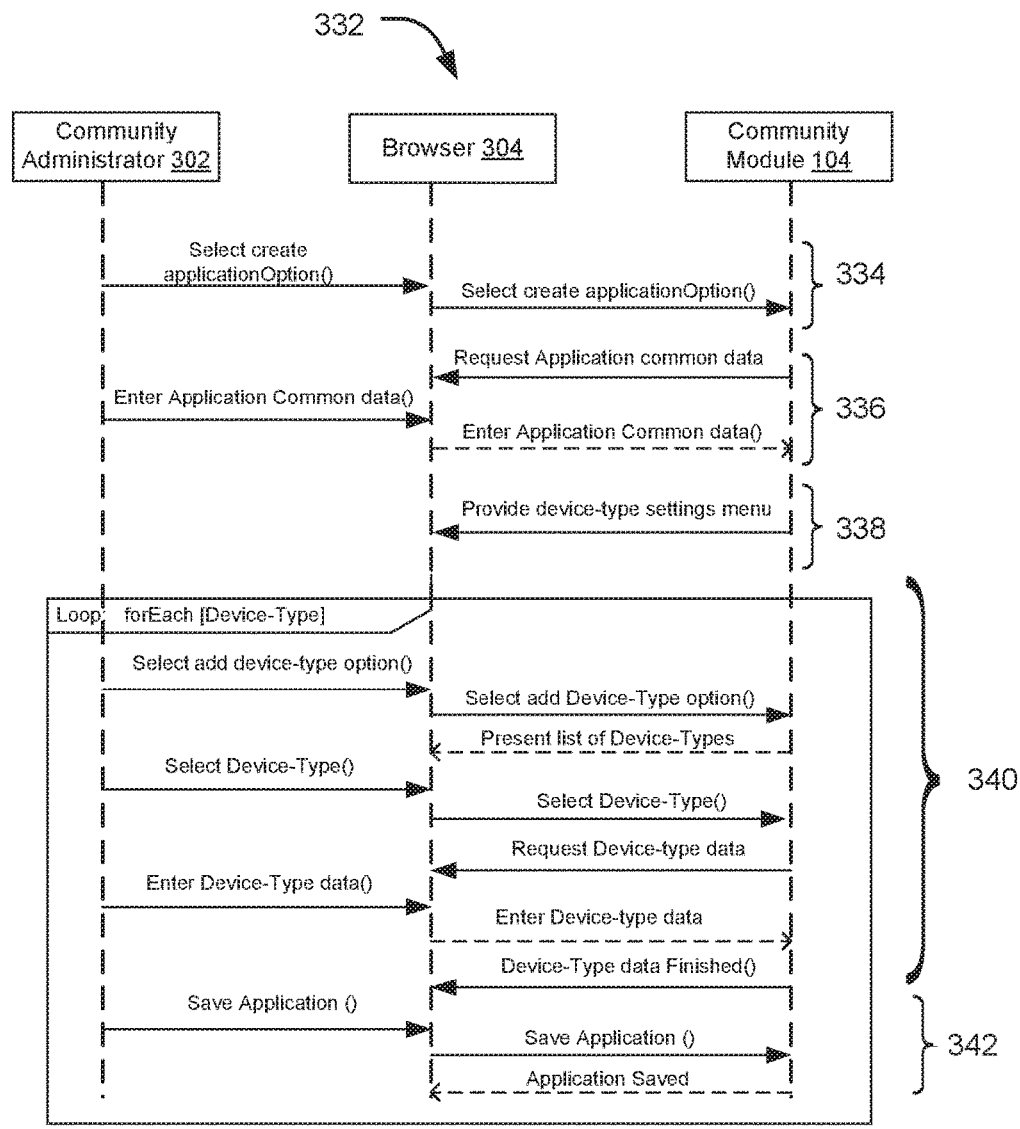

FIG. 3c illustrates a sequence diagram 332 indicating a process for creating an application, according to an example of the present subject matter. For the sake of brevity, message exchange pertaining to validation of the credentials of the community administrator have not been illustrated; however it will be appreciated that the validation may be performed in a manner similar to the one define above for the community creation process. In present example, on receiving the community menu, the community administrator 302 may select an option to create an application as illustrated at step 334. On receiving such a request, the community module 104 may request the community administrator 302 to provide the common application data, as illustrated at step 336. On receiving the common application data, the community module 104 may provide a device-type settings menu to the community administrator 302 as illustrated at step 338. At step 340, the community administrator 302 may select a device-type and provide the application-device type data for each of the selected device-type. Finally, at step 342, the application may be saved in an application store of the content management system.

Figure 3D:
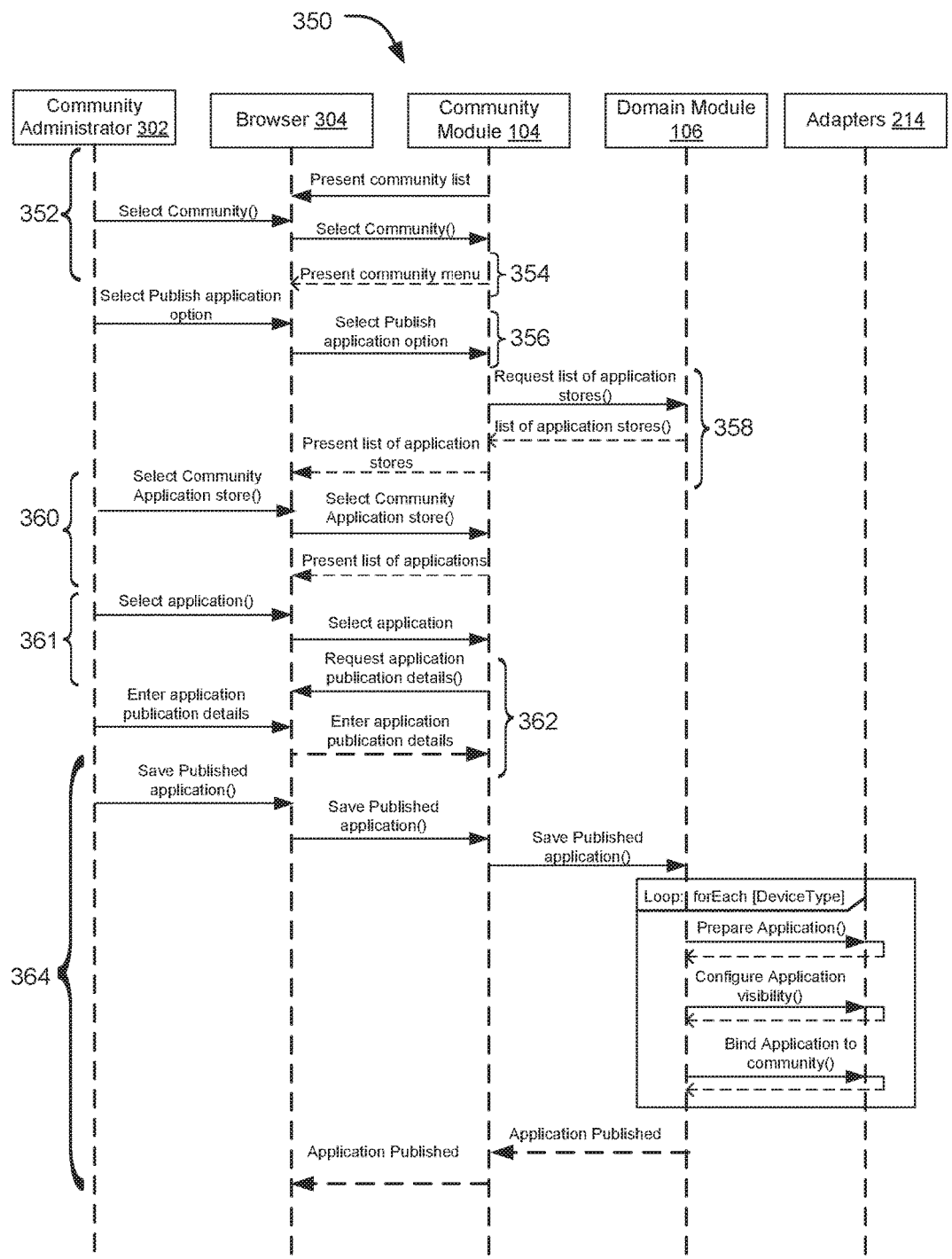

FIG. 3d illustrates a sequence diagram 350 illustrating a process for publishing an application in a community, according to an example of the present subject matter. Again, for the sake of brevity, the process of validating the community administrator 302 has not been explained; however it will be appreciated that the validation process is similar to one described above. Once the community administrator 302 is validated, at step 352, the community module 104 may provide the community list to the community administrator 302. The community administrator 302 may select a community from the community list and, in response to the selection, the community module 104 may provide the community menu, as illustrated at step 354. To publish the application, at step 356, the community administrator 302 may select a publish application option from the community menu.

As illustrated at step 358, in response to application publication request, the community module 104 may obtain a list of application stores from the domain module 106 and provide the list to the community administrator 302. At step 360, from the list, the community administrator 302 may select an application store and for the selected application store, a list of applications may be provided to the community administrator. Further, from the list of applications, an application to be published in the community may be selected, as illustrated at step 361. For the selected application, the community module 104 may request the community administrator 302 to provide publication details, as illustrated at step 362.

Finally at step 364, the application may be saved in the application store of the community. Further, to publish the application, for each device-type associated with the community, the domain module 106 may associate the application with the community and configure an application management service of the community to provide the application to various user groups associated with the community.

Figure 4A:
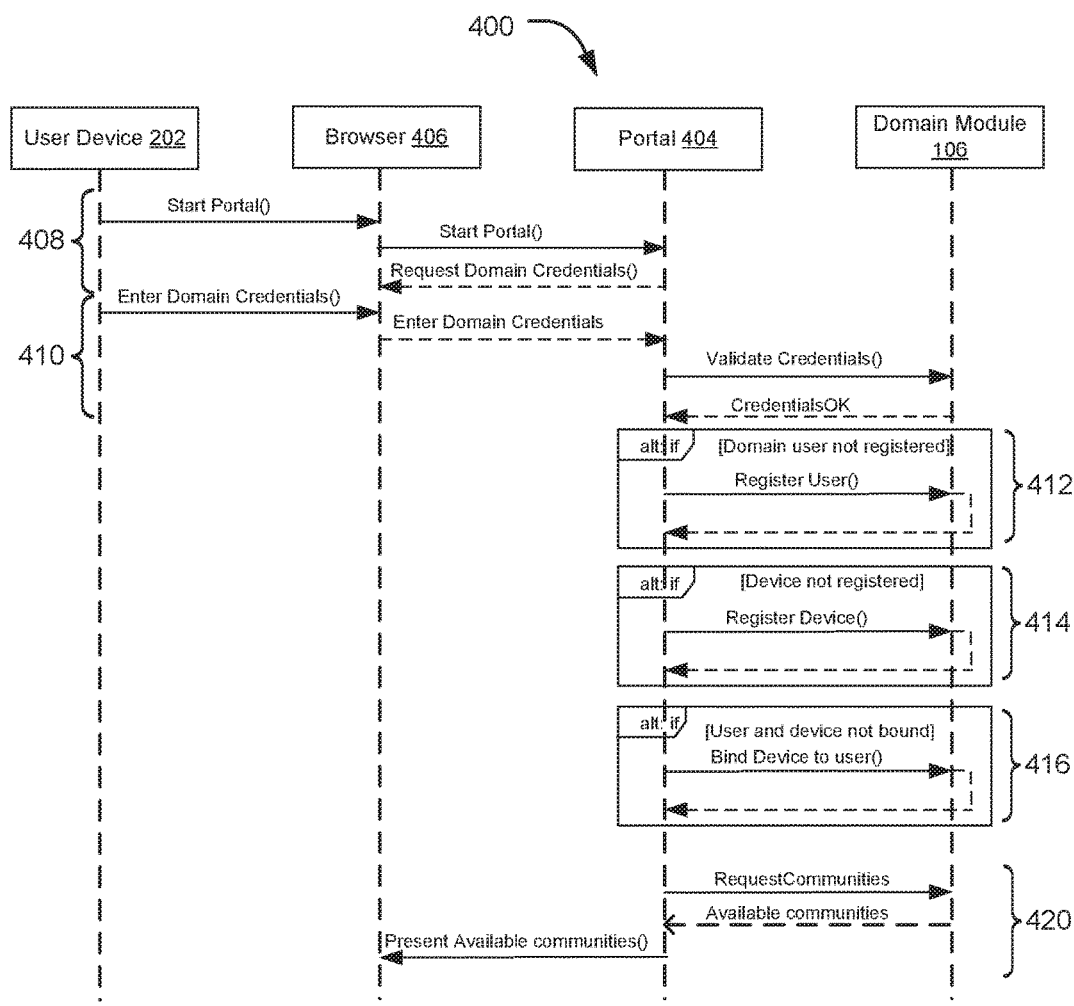
FIGS. 4a and 4b illustrate sequence diagrams for various processes pertaining to content management, according to various examples of the present subject matter.

FIG. 4a illustrates a sequence diagram 400 indicating a user and user device enrollment process, according to an example of the present subject matter. As illustrated, the user device 202 may access a portal 404 managed by the enterprise. The user may access the portal 404 through a browser 406 hosted by the user device 202. In an example, the portal 404 may be associated with the content management domain of the enterprise. At step 408, the user device 202 may provide a request to access the portal 404, which in turn may request for domain credentials from the user. In response to the request, at step 410, the user device 202 may provide the domain credentials, which may be validated by the domain module 106. When validated, at step 412, the domain module 106 may ascertain whether the user is registered with the content management domain and if it is ascertained that the user is not registered, the domain module 106 registers the user with the content management domain. Likewise, at step 414, if the user device 202 is not registered, the domain module 106 may register the device. At step 416, the domain module 106 may ascertain whether the user is bound to the user device 202 and if not, the domain module 106 binds the user device 202 to the user in the content management domain.

On ascertaining that the user and user device are bound, and are registered with the content management domain, at step 420, the portal 404 may request the domain module 106 to provide the community list, which may then be displayed on the browser 406 of the user device 202.

Figure 4B:
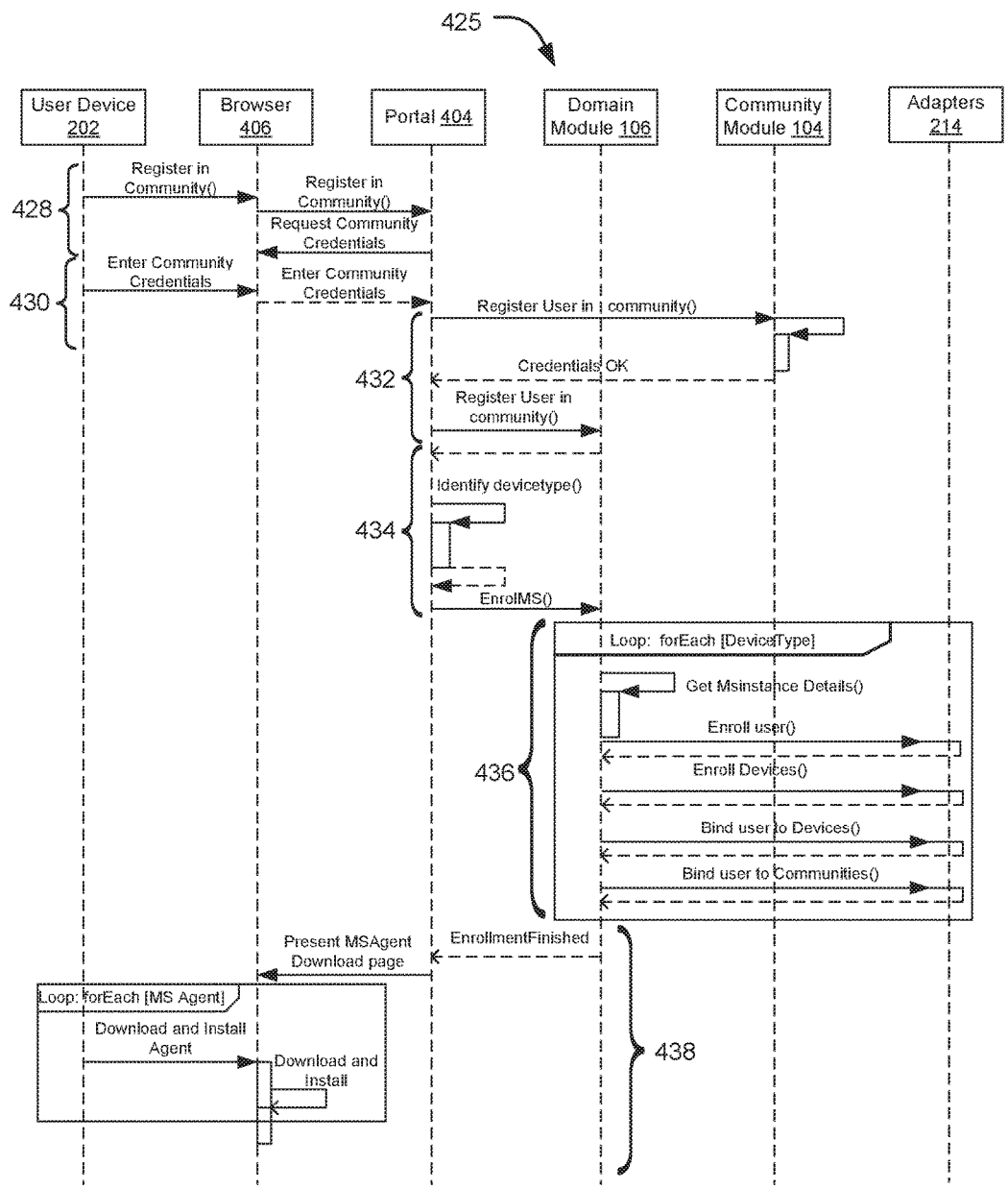

FIG. 4b illustrates a sequence diagram 425 indicating a community registration process, according to an example of the present subject matter. Referring to the description above, the user device 202 may be provided the community list to select a community the user may wish to register with. To register to the selected community, at step 428 the user device 202 may provide a request to register with the community and the portal 404 may in turn request the user device 202 to provide community credentials. At step 430, the user device 202 may provide the community credentials, which in turn may be provided to the community module 104 for validation. At step 432, if the community credentials are validated, the portal 404 requests the domain module 106 to register the user with the community. At step 434, the portal 404 may identify the device-type of the user device 202 and provide a request to the domain module 106 to enroll the user with the management service indicated by a device-community corresponding to the user device 202.

At step 436, the domain module 106 may identify the management service indicated by a corresponding device-community policy. For each management service indicated by the device-community policy, using the corresponding adapter 214, the user and the user device may be enrolled with the management service. Further, the enrollment may also include, linking of the user to the user device and the community in a management service repository.

At step 438, once the enrollment is finished, an MS agent corresponding to each of the management service is provided to the user device 202, which may download and install the MS agent to manage the content of the enterprise.

Figure 5:
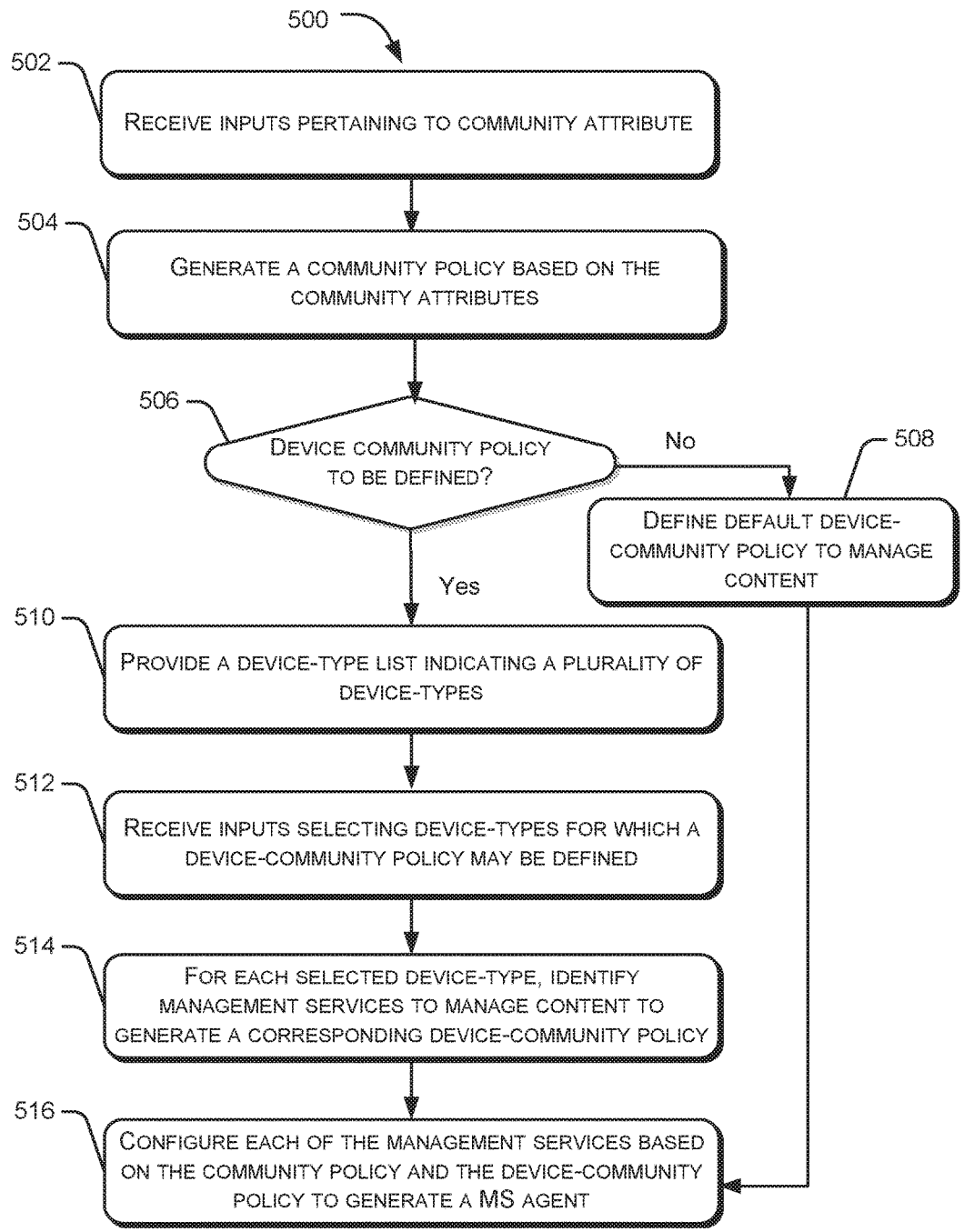
FIG. 5 illustrates a method for generating a community policy and a device-community policy, according to an example of the present subject matter.
Figure 6:
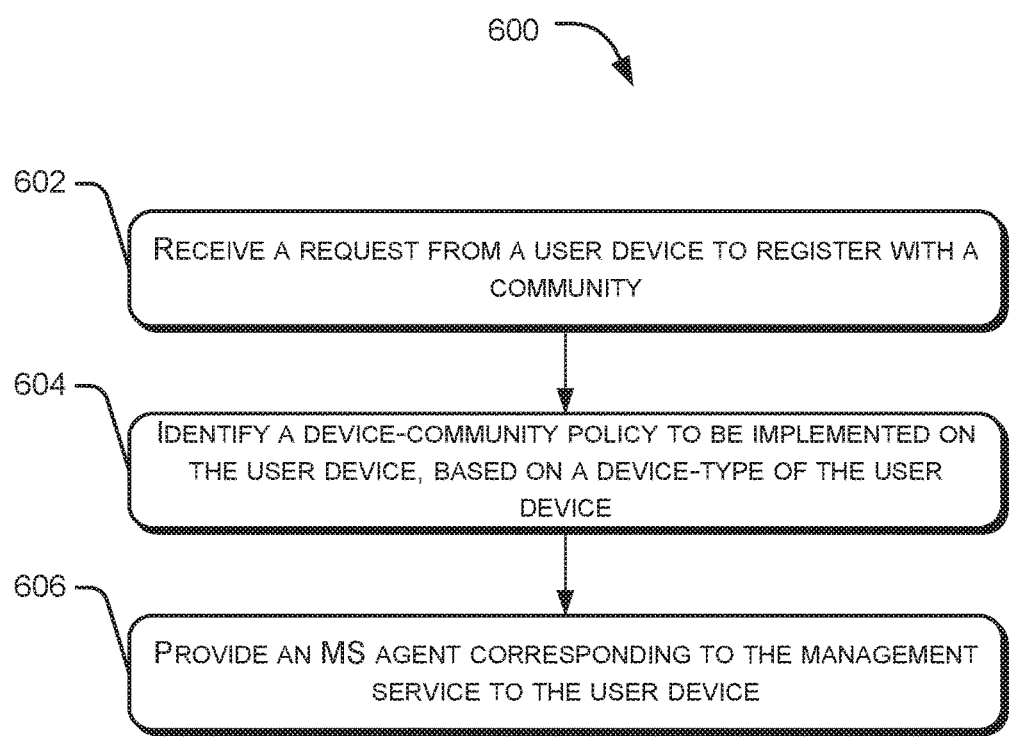
FIGS. 6 and 7 illustrate a method for managing enterprise content, according to various examples of the present subject matter.
Figure 7:
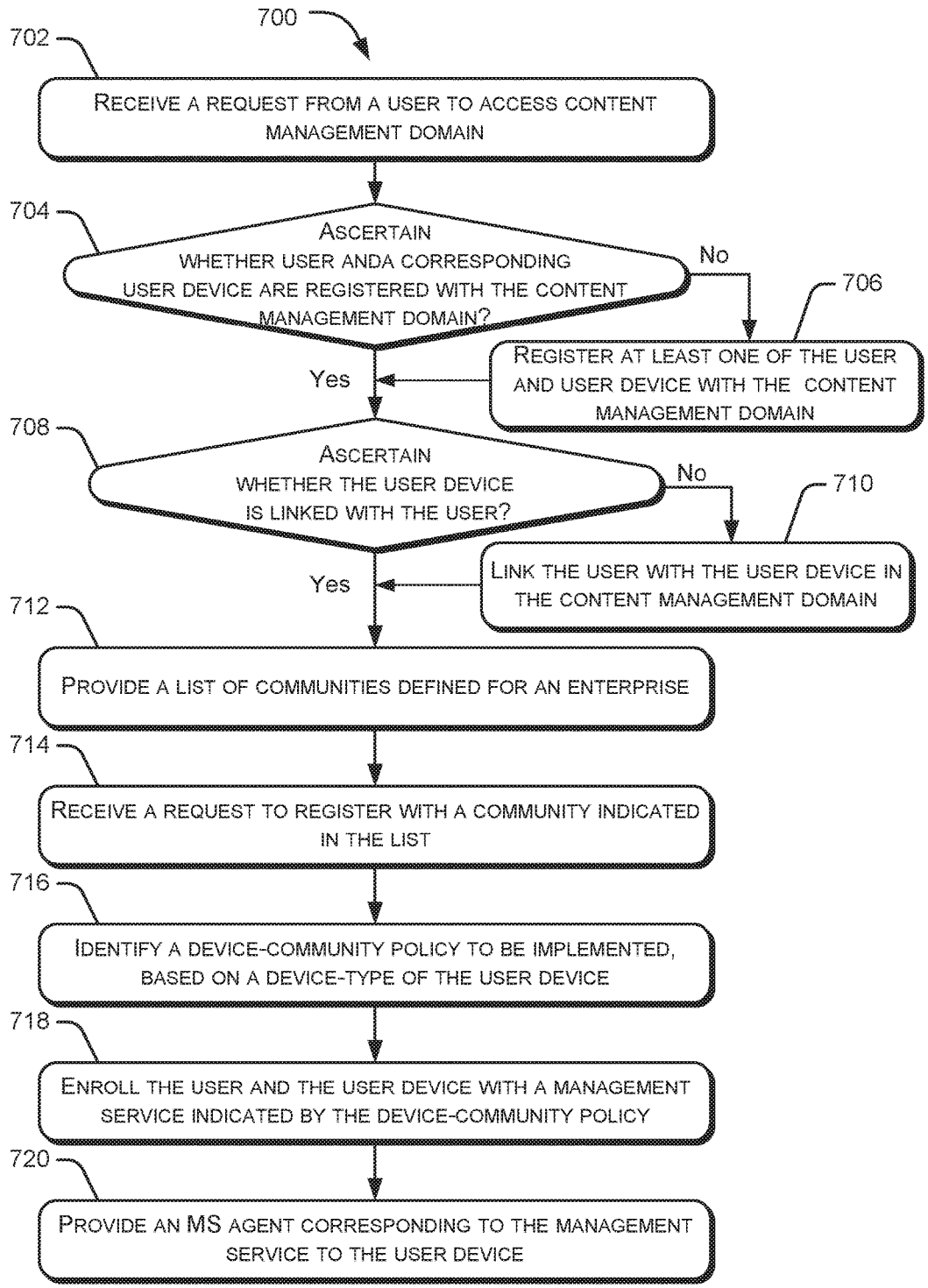

Methods 500, 600, and 700 are described in FIG. 5, FIG. 6, and FIG. 7 respectively, for defining polices and managing enterprise content accessed by user device, such as the user devices 202, based on the policies, according to an example of the present subject matter.

The order in which the methods 500, 600, and 700 are described is not intended to be construed as a limitation, and any number of the described method blocks can be combined in any order to implement the methods 500, 600, and 700 or an alternative method. Additionally, individual blocks may be deleted from the methods 500, 600, and 700 without departing from the spirit and scope of the subject matter described herein. Furthermore, the methods 500, 600, and 700 can be implemented in any suitable hardware, software, firmware, or combination thereof.

It would be understood that the methods 500, 600, and 700 can be performed by programmed computing devices, for example, based on instructions retrieved from non-transitory computer readable media. The computer readable media can include machine-executable or computer-executable instructions to perform whole or a part of the described method. The computer readable media may be, for example, digital memories, magnetic storage media, such as a magnetic disks and magnetic tapes, hard drives, or optically readable data storage media.

Referring to FIG. 5, the method 500 may be performed by a computing system, such as the system 100.

At block 502, to define a community policy for a community, inputs pertaining to community attributes may be received. For example, a community administrator may provide inputs pertaining to the community attributes to the community module 104. The community attributes may be related to functional part of the community policy and may not include details, such as implementation details. The community policy may include rules, which may be applicable for community members, rules defining device-type based access to enterprise data, and rules defining role based access to the enterprise data.

At block 504, a community policy may be generated based on the community attributes. In an example, the community module 104 may generate the community policy.

At block 506, it is ascertained whether a device-community policy is to be defined for a given device-type associated with the community. For instance, the community administrator may provide an input to the community module 104 indicating whether the device-community policy is to be defined. In case it is ascertained that the device-community policy is not to be defined, the method 500 may branch to ('No' branch) block 508.

At block 508, a default device-community policy may be defined to manage content. For instance, the domain module 106 may define default device-community policy.

However, if at block 506, it is ascertained that the device-community, the method 500 may proceed to ('Yes' branch) block 510.

At block 510, a device-type list including a plurality of device-types may be provided, for instance, to the community administrator.

At block 512, inputs selecting device-types, from among the plurality of the device-types, for which a device-community policy may be defined, are received.

At block 514, for each selected device-type, management services to manage content may be identified to generate a corresponding device-community policy. The management services may be identified based on inputs provided by, for instance, the community administrator, an application owner, or a security administrator.

At block 516, each management service indicated by the device-community policy may be configured based on the community policy and the device-community policy. In an example, when a user registers with a community, based on a corresponding device-community policy, an MS agent corresponding to the management service may be generated. The MS agent may be provided to a user device corresponding to a user to manage content of the enterprise.

Referring to FIG. 6, the method 600 may be performed by a computing system, such as the system 100.

At 602 a request from a user device to register with a community defined for an enterprise is received. In an example, a community policy may be defined for each community and enterprise content provided to user devices registered with the community is managed, based on the community policy.

At block 604, a device-community policy to be implemented on the user device is identified, based on a device-type of the user device. In an example, the domain module 106 may identify the device-community policy.

At block 606, an MS agent is provided to the user device, based on the device-community policy. The MS agent may be understood to be an instance of the management service.

Referring to FIG. 7, the method 700 for managing enterprise content on a user device is described.

At block 702, a request from a user to access content management domain is received. The user may provide the request from a corresponding user device, such as the user device 202.

At block 704, it is ascertained whether both, user and a corresponding user device are registered with the content management domain, based on registration data, such as the registration data 228. In an example, the domain module 106 may ascertain whether the user and/or the user device are registered with the content management domain. In case it is ascertained that the any one or both the user and the user device are not registered with the content management domain, the method 700 may branch to ('No' branch) block 706.

At block 706, at least one of the user and the user device are registered with the content management domain. In an example, in case the user is not registered with the content management domain, then at block 706, the user may be registered. Additionally or alternatively, if the user device is not registered, the user device may also be registered with the content management domain.

However, if at block 704, it is ascertained that both the user and the user device are registered with the content management domain, the method 700 may proceed to ('yes' branch) block 708. At block 708, it is ascertained whether the user device is linked with the user, based on registration data. In case it is ascertained that the user device is not linked with the user, the method 700 may branch to ('No' branch) block 710.

At block 710, the user device may be linked with the user in the content management domain. In an example, the domain module may link the user device with the user.

However, if at block 708, it is ascertained that the user device is linked with the user, the method 700 may proceed to ('yes' branch) block 712. At block 712, a list of communities defined for the enterprise is provided to the user. In an example, the list of communities may be provided by the domain module 106.

At block 714, a request to register with a community indicated by the list is received. In an example, the user device 202 may provide the request to the community module 104.

At block 716, based on a device-type of the user device, a device-community policy to be implemented on the user device is identified.

At block 718, the user and the user device are enrolled with a management service indicated by the device-community policy. The management service being configured to manage enterprise content based on a community policy defined for the community. In an example, the domain module 106 may enroll the user and the user device with the management service.

At block 720, an MS agent corresponding to the management service is provided to the user device. In an example, the domain module 106 may provide the MS agent to the user device to facilitate management of enterprise content on the user device.

Figure 8:
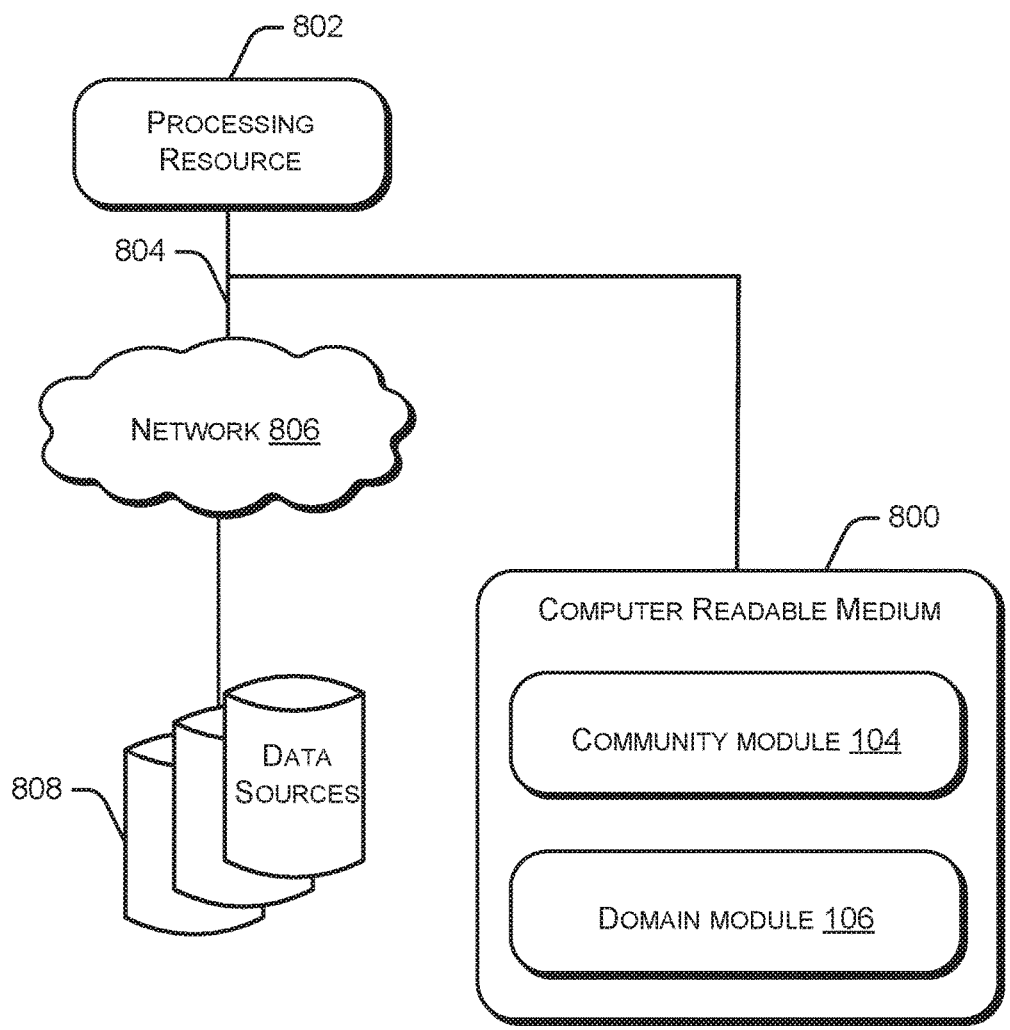
FIG. 8 illustrates a computer readable medium storing instructions to provide for enterprise content management, according to an example of the present subject matter.

FIG. 8 illustrates a computer readable medium 800 storing instructions for controlling shutdown of computing devices, according to an example of the present subject matter. In one example, the computer readable medium 800 is communicatively coupled to a processing resource 802 over a communication link 704.

For example, the processing resource 802 can be a computing device, such as a server, a laptop, a desktop, a mobile device, and the like. The computer readable medium 800 can be, for example, an internal memory device or an external memory device or any commercially available non transitory computer readable medium. In one implementation, the communication link 804 may be a direct communication link, such as any memory read/write interface. In another implementation, the communication link 804 may be an indirect communication link, such as a network interface. In such a case, the processing resource 802 can access the computer readable medium 800 through a network 806. The network 806 may be a single network or a combination of multiple networks and may use a variety of different communication protocols.

The processing resource 802 and the computer readable medium 800 may also be communicatively coupled to data sources 808 over the network 806. The data sources 808 can include, for example, databases and computing devices. The data sources 808 may be used by the requesters and the agents to communicate with the processing unit 802.

In one implementation, the computer readable medium 800 includes a set of computer readable instructions, such as the community module 104 and the domain module 106. The set of computer readable instructions can be accessed by the processing resource 802 through the communication link 804 and subsequently executed to perform acts for managing content of an enterprise.

On execution by the processing resource 802, the community module may generate a community policy for a community defined for an enterprise, based on inputs provided for community attributes. Further, the community policy is enforced on a plurality of user devices registered with the community. The community module 104 may further create a device-community policy corresponding to the community policy, where the device-community policy may be defined for each of a plurality of device-types associated with the community. The device-community policy may indicate a management service to be implemented for enforcing the community policy on a user device of a device-type for which the device-community policy may be define.

Further, the domain module 106 may configure, using the adapters 214, the management service by the device-community policy to manage enterprise content on the user device based on the community policy.

Although implementations for device-type based content management have been described in language specific to structural features and/or methods, it is to be understood that the appended claims are not necessarily limited to the specific features or methods described. Rather, the specific features and methods are disclosed as example implementations for device-type based content management.

We claim:

1. An enterprise content management system comprising:
a processor;
a community module coupled to the processor to generate:
a community policy for a community defined for an enterprise, wherein the community policy is enforced on a plurality of user devices registered with the community; and
a device-community policy associated with the community policy, wherein the device-community policy is enforced on a user device, from among the plurality of user devices, based on a device-type associated with the user device, the device-community policy being indicative of a management service to be used to enforce the community policy for the device-type; and
a domain module coupled to the processor to provide a management service agent (MS agent) to the user device, based on the management service, wherein the MS agent manages enterprise content on the user device as defined by the community policy and the device-community policy.

2. The enterprise content management system as claimed in claim 1, wherein the enterprise content management system further comprises an adapter coupled to the processor, wherein the adapter provides for configuration of the management service, based on the community policy.

3. The enterprise content management system as claimed in claim 1, wherein the domain module:
receives a request from the user device to register with the community;
identifies the device-community policy to be implemented on the user device, based on the device-type associated with the user device; and
configures the management service, based on a user-device pair, to generate the MS agent.

4. The enterprise content management system as claimed in claim 1, wherein the community module:
receives a request to create the community for the enterprise from a community administrator; and
defines the community policy for the community, based on details provided for community attributes, wherein the community attributes provide controlled access to the enterprise content.

5. The enterprise content management system as claimed in claim 1, wherein the community module:
provides a list of device-types associated with the community to a community administrator;
for each device-type selected by the community administrator, determines available management services; and
for each selected device-type, generates the device-community policy, based on the management service selected from the available management services.

6. The enterprise content management system as claimed in claim 1, wherein the domain module defines a default device-community policy for the community, wherein the default device-community policy is used to implement the community policy on the user device, when the device-community policy is not defined for the device-type.

7. A computer implemented method for device-type based content management comprising:
receiving a request from a user device to register with a community defined for an enterprise, wherein enterprise content on the user device registered with the community is managed based on a community policy defined for the community;

identifying a device-community policy associated with the community policy to be implemented on the user device, based on a device-type of the user device, the device-community policy being indicative of a management service to be used to enforce the community policy for the device-type; and providing a management service agent (MS agent) to the user device, based on the device-community policy, wherein the MS agent is an instance of the management service indicated by the device-community policy and is configured based on the community policy and the device-community policy to manage the enterprise content on the user device.

8. The computer implemented method as claimed in claim 7, wherein providing the MS agent further comprises enrolling the user device and a user corresponding to the user device with the management service.

9. The computer implemented method as claimed in claim 7 further comprising:

ascertaining whether the user and the user device are registered with a content management domain, wherein the content management domain interfaces the user device with the community to provide access to the enterprise content;

registering the user and the user device, based on the ascertaining; and linking the user device to the user in the content management domain to generate a user-device pair, when the user and the user device are not linked to each other, wherein the MS agent is configured, based on the user-device pair.

10. The computer implemented method as claimed in claim 7, wherein the method further comprises:

ascertaining whether the user is registered with the community and is not registered with a content management domain; and generating dummy domain credentials to register the user and the user device with the content management domain, based on the ascertaining.

11. A non-transitory computer-readable medium comprising instructions executable by a processor to:

generate a community policy for a community defined for an enterprise, based on inputs provided for community attributes, the community policy being enforced on a plurality of user devices registered with the community, wherein the community attributes provide controlled access to enterprise content;

create a device-community policy associated with the community policy, the device-community policy being defined for each of a plurality of device-types associated with the community, wherein the device-community policy indicates a management service to be implemented to enforce the community policy on a user device of a device-type, from amongst the plurality of device-types; and configure a management service agent (MS agent) to the user device based on the management service to manage enterprise content on the user device based on the community policy and the device-community policy.

12. The non-transitory computer-readable medium as claimed in claim 11, wherein the non-transitory computer-readable medium further comprises instructions executable by the processor to provide the MS agent to the user device to manage enterprise content on the user device, based on a user-device pair, wherein the MS agent is an instance of the management service.

13. The non-transitory computer-readable medium as claimed in claim 11, wherein the non-transitory computer-readable medium further comprises instructions executable by the processor to:

provide a list of communities to a domain administrator, the list comprising published communities and unpublished communities, wherein the published communities are available to users associated with the enterprise; and publish community details pertaining to an unpublished community in a content management domain, based on inputs provided by the domain administrator, wherein the content management domain interfaces the user device with the community to provide access to the enterprise content.

14. The non-transitory computer-readable medium as claimed in claim 11, wherein the non-transitory computer-readable medium further comprises instructions executable by the processor to:

receive a request to add an application in an application store of a content management domain;

prompt a community administrator to provide common application data and application-device type data, the common application data including details for application parameters common to all device-types and the application-device type data including details pertaining to a device-type associated with the application; and save the application, the common application data, and the application-device type data in the application store of the content management domain.

15. The non-transitory computer-readable medium as claimed in claim 14, wherein the non-transitory computer-readable medium further comprises instructions executable by the processor to:

receive a request to publish the application in an application store of the community;

for each device-type associated with the community, based on a corresponding device-community policy, identify an application management service to manage applications; and configure the application in each application management service, based on corresponding application-device type data.

* * * * *